(No Model.)
D. S. WEST.
TRUCK.
No. 420,322. Patented Jan. 28, 1890.
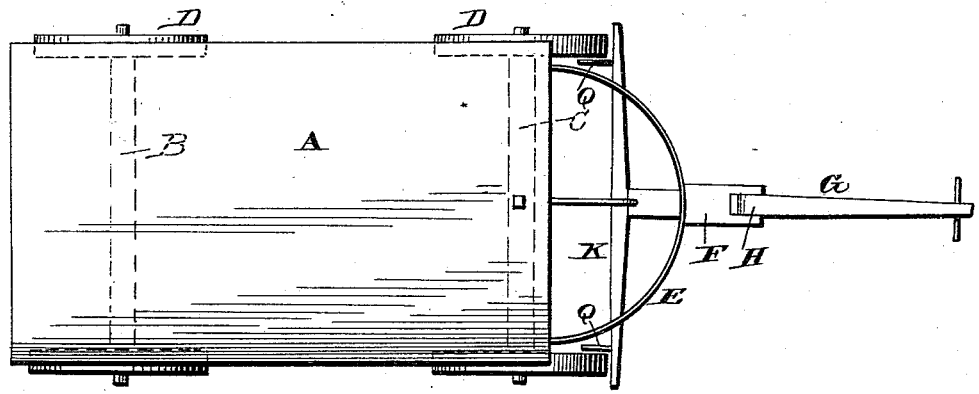
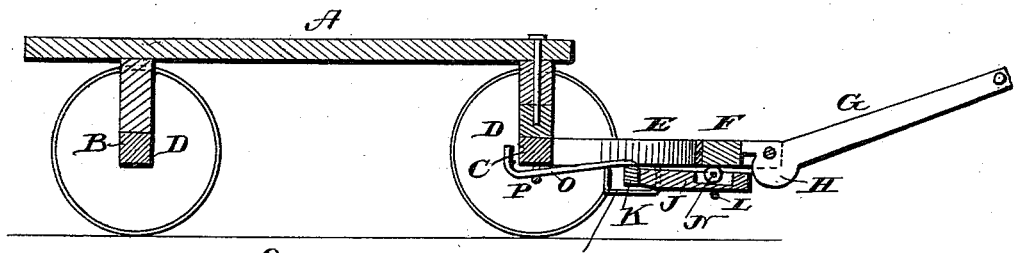
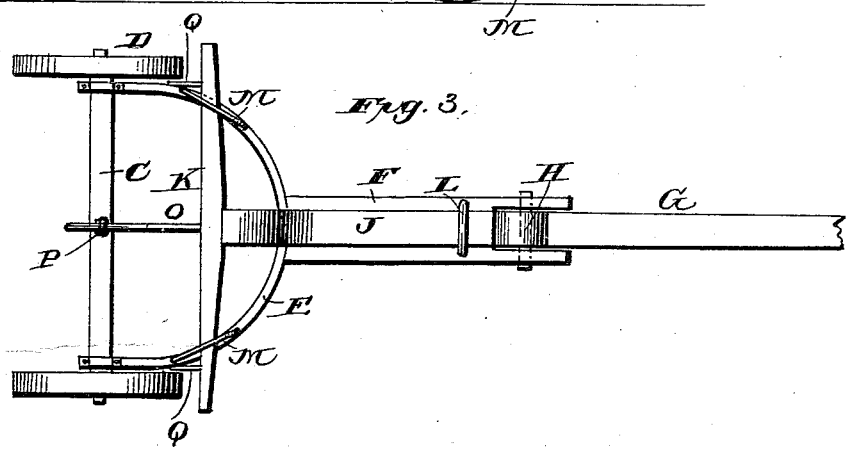
WITNESSES:
F. L. Ourand
C. F. Chisholm
INVENTOR:
Derick S. West
by James Dagger &c.
Attorneys

UNITED STATES PATENT OFFICE.

DERRICK SUMNER WEST, OF GREAT FALLS, MONTANA.

TRUCK.

SPECIFICATION forming part of Letters Patent No. 420,322, dated January 28, 1890.

Application filed August 27, 1889. Serial No. 322,070. (No model.)

*To all whom it may concern:*

Be it known that I, DERRICK SUMNER WEST, a citizen of the United States, and a resident of Great Falls, in the county of Cascade and Territory of Montana, have invented certain new and useful Improvements in Trucks; and I do hereby declare that the following is a full, clear, and exact description of the invention, which will enable others skilled in the art to which it appertains to make and use the same.

My invention relates to improvements in trucks—such as may be termed "platform-trucks"—and has especial reference to a brake for a truck of this character.

The object of the invention is the provision of a simple, durable, and cheap brake which will be ineffective while the handle of the truck is raised, or, in other words, when the truck is being moved, but which will when the handle is allowed to fall cause the brake to automatically brake the wheels of the truck and prevent the same from moving.

To attain the desired object, the invention consists of a brake-bar having an arm, guides for said brake-bar and arm, and a handle or lever adapted to engage the arm when the handle is lowered to move said arm and brake-bar and cause the brake-bar to engage the wheels, and thus effect the stopping of the truck.

The invention further consists of the novel construction of parts comprising the device and their peculiar arrangement and adaptation, substantially as illustrated, described, and specifically claimed.

In the accompanying drawings, forming part of this specification, and in which like letters of reference indicate corresponding parts, Figure 1 represents a plan view of a truck provided with my improved brake. Fig. 2 represents a longitudinal section thereof, and Fig. 3 represents a bottom plan view thereof.

Referring by letter to the drawings, A designates the platform of the truck; B, the rear axle; C, the front axle, and D the supporting and traveling wheels. To the front axle C are secured the ends of a semicircular band or yoke E, to the forward portion of which is connected the bifurcated arm F. In said bifurcated arm F is fulcrumed or pivoted the lower end of the handle G, which is formed at said end with an eccentric or head H, adapted to contact with the arm J, connected to the brake-bar K, and thus move the brake-bar against the front wheels of the truck, and thus brake said wheels, as is evident. The arm J is guided by a staple or yoke L, depending from the arm F. The brake-bar K is guided by staples M, depending from the semicircular or segmental band E, and the arm J carries a friction-roller N, which rides against the under side of the arm F and enables said arm to move with ease. A rod O is also connected to the arm J and passes through an eye P, also serving to guide said bar or arm J, and near the outer ends of the brake-bar are attached pins or studs or lugs Q, which keep the brake from sidewise or lateral movement.

From the foregoing description, taken in connection with the drawings, the operation of my brake will be readily understood.

When the handle is in use or elevated, the brake-bar is out of contact with the wheels, and immediately upon lowering said handle the head thereon engages the arm and forces the brake-bar against the wheels, effecting an automatic and instant braking of the wheels.

A truck of this character possesses many points of merit, the brake operating effectively upon the release of the handle to stop the truck on level or inclined surface, and, being also simple and durable, as well as inexpensive, is calculated to commend itself as a thoroughly practical device.

Having thus described my invention, what I claim as new, and desire to secure by Letters Patent, is—

1. In a truck, the combination of a band or yoke, a bifurcated arm, a brake-arm, and a lever provided with a rounded head eccentrically mounted in said bifurcated arm, so as to engage the arm on the brake-bar, substantially as set forth.

2. In a truck, the combination, with the wheels, of the brake-bar having the arm and the handle having a head for engaging said arm to force the brake-bar against the wheels, substantially as described.

3. In a truck, the band or yoke, the bifurcated arm, the brake-bar having the arm, and the lever pivoted in the bifurcated arm and adapted to engage the arm on the brake-bar, substantially as and for the purpose described.

4. In a truck, the segmental band or yoke, the arm connected thereto, the brake-bar having the arm, the guides for said brake-bar and arm, and the lever pivoted to the arm on the yoke and adapted to engage the arm on the brake-bar, substantially as and for the purpose described.

5. A brake consisting of the brake-bar having the studs or pins and the arm, the yoke having the arm, the lever having the head for engaging the arm of the brake-bar, and the friction-roller in the arm of the brake-bar, all arranged and adapted to serve substantially as and for the purpose described.

6. In a truck, the combination of a brake-bar having the arm secured thereto, a handle having a head for engaging said arm, and a rearwardly-extending guide-rod connected to said brake-bar, substantially as set forth.

In testimony that I claim the foregoing as my own I have hereunto affixed my signature in presence of two witnesses.

DERRICK SUMNER WEST.

Witnesses:
G. D. LINN,
A. E. McFADDEN.